United States Patent [19]

Bjor et al.

[11] 3,878,382

[45] Apr. 15, 1975

[54] APPARATUS FOR DETERMINING SIGNAL MAGNITUDES EXPRESSING THOSE PARAMETERS WHICH INDICATE HOW QUICKLY CHANGES TAKE PLACE IN A TIME FUNCTION

[75] Inventors: Hakon Einar Bjor, Oslo; Harek Hognestad, Haslum, both of Norway

[73] Assignee: Nortronic A/S and Sentralinstitutt for Industriell, Forskningsveien, Oslo, Norway

[22] Filed: Nov. 6, 1973

[21] Appl. No.: 413,204

[30] Foreign Application Priority Data

Nov. 14, 1972 Norway .............................. 4132/72

[52] U.S. Cl. .................... 235/183; 73/555; 235/197

[51] Int. Cl. ............................................... G06g 7/18

[58] Field of Search ....... 235/183; 181/125; 73/555, 73/556, 557

[56] References Cited

UNITED STATES PATENTS

| | | | |
|---|---|---|---|
| 2,982,914 | 5/1961 | Stewart | 181/.5 AP |
| 3,270,833 | 9/1966 | Schroeder | 181/.5 AP |
| 3,521,046 | 7/1970 | Tippetts | 235/183 |
| 3,549,874 | 12/1970 | Vachitis | 235/183 |
| 3,673,400 | 6/1972 | Ito | 235/183 |

*Primary Examiner*—Felix D. Gruber
*Attorney, Agent, or Firm*—Wenderoth, Lind & Ponack

[57] ABSTRACT

Apparatus for determining signal magnitudes together expressing those parameters which indicate how quickly changes take place in a rising or falling time function. This apparatus comprises an integrating circuit which integrates the time function at least once to form a new time function the character of which is given by said first time function and the integrating circuit, a comparing circuit connected to the output side of the integrating circuit, and a function generator group connected to the comparing circuit for comparing the new time function with known output signals representing known time functions from the function generator group. On coincidence between the new time function and the known time functions, one or more function values on the new time function are determined, said function values corresponding to the signal magnitudes.

11 Claims, 8 Drawing Figures

Figure 1:
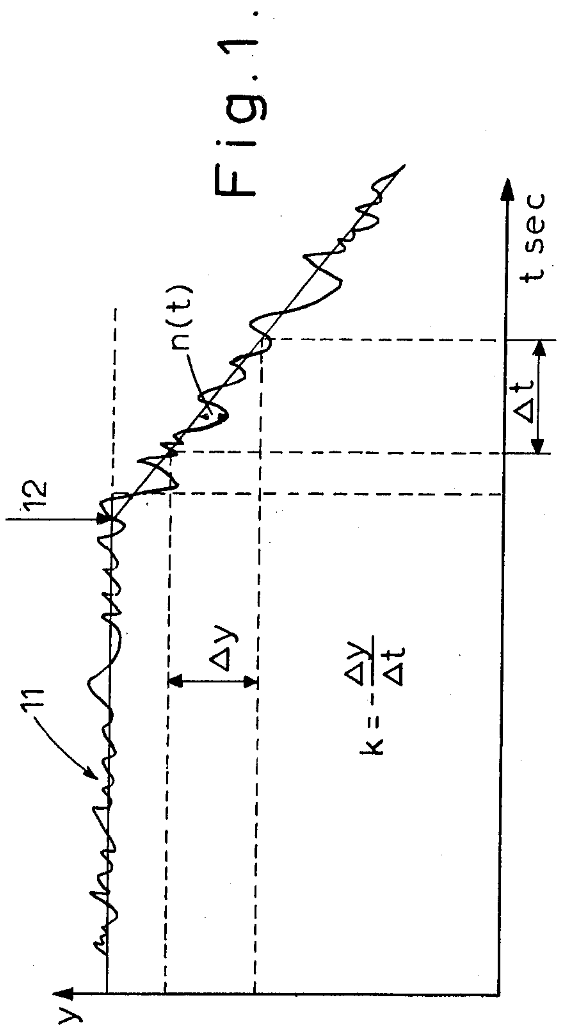

APPARATUS FOR DETERMINING SIGNAL MAGNITUDES EXPRESSING THOSE PARAMETERS WHICH INDICATE HOW QUICKLY CHANGES TAKE PLACE IN A TIME FUNCTION

This invention realtes to an apparatus for determining signal magnitudes together expressing those parameters which indicate how quickly changes take place in a rising or falling time function.

A number of, or perhaps most of the magnitudes which can be measurued or recorded within science and technology, are of such a kind that they increase or fall according to an exponential function. When studying the phenomena which occur, it is of interest to know those parameters which describe how quickly the changes take place. It will often be of interest to known the time constant of the exponential function. The invention to be described here may be employed for instance within the field of acoustics for measuring the reverberation time in rooms. The following explanation of the invention is in particular related to this field of use, although the invention may also be employed for other purposes.

As known, the reverberation time is the phenomenon consisting therein that when a source of sound in a room is suddenly switched off, the sound pressure in the room will not suddenly disappear, but will gradually die away. How quickly the sound pressure dies away depends upon the volume and the sound absorption of the room. According to definition the reverberation time is the time taken from the moment the source of sound is switched off until the moment when the sound pressure is 1/1000 of the original, in other words until the sound pressure level has decreased by 60 dB. It is common practice to use a logarithmic scale when recording reverberation curves, since this gives a better over-all picture and corresponds to the logarithmic expression of sound pressure used in acoustics.

In the practical recording of reverberation time the recording signals always have a considerable degree of fluctuations. The method mostly used for measuring reverberation time therefore consists in recording the sound pressure level from the moment when the source of sound is switched off and then visually to adapt a straight line manually through the recorded curve. The slope of this line is directly dependent upon the time constant, from which the reverberation time can be determined. In addition to the fact that this is a labour-consuming method for determining reverberation time, the result will to some degree depend upon the subjectivie evaluation involved in the adaption of the straight line.

Attempts have been made to build instruments which automatically determine the slope, based upon measurement of the time interval between two levels of the curve. This leads to much uncertainty in the determination, because of the fluctuations of the signal. Filtering with a time constant for the purpose of reducing the fluctuations will also influence the slope and this has been found to be of little success in practice.

The above example from the field of acoustics illustrates a general problem, since most of the physical magnitudes which can be measured or detected, as mentioned above, have the property that they rise or fall exponentially in a way corresponding to increasing or decaying sound. In a number of cases there is, therefore, a need for determining those parameters which indicate how quickly changes take place in rising or falling exponential time functions. The apparatus according to the invention fullfills this need completely and besides a need for determining corresponding parameters in connection with rectilinear time variations.

The apparatus according to the invention is characterized by comprising an integrating circuit which integrates the time function at least once to form a new time function the character of which is given by said first time function and the integrating circuit, a comparing circuit connected to the output side of the integrating circuit, and a function generator group connected to the comparing circuit for comparing the new time function with known output signals representing known time functions from the function generator group for determining on coincidence between the new time function and the known time functions, one or more function values on the new time function, said function values corresponding to the signal magnitudes.

In use the apparatus according to the invention has proved to be very advantageous, since additionally its sensitivity to fluctuations of the signal has been considerably reduced compared to what has been obtained earlier.

The apparatus defined above is directly suitable for processing rectilinear time functions and non-linear functions when the dynamic range is not larger than what can be handled by present time electronic components with a sufficient degree of exactness. Regarding the processing of exponential time functions within larger dynamic ranges, it is practical to apply the time functions to the integrating circuit in the apparatus from an input circuit comprising a device for presenting the functions in a logarithmic scale in order that a rectilinear curve be obtained.

The signal magnitudes determined can be subjected to various simple calculating operations, either in a manual way or by means of for instance electronic components for calculating those parameters which indicate how quickly changes take place in the applied rising or falling time function.

After integration the signal will be a new time function. The new time function will be a parabola after one integration, in cases where the applied time function is a straight line. Provided that the superposition noise signal is a stochastic function with an average value equal to zero, the new function — for instance the parabola function — will be a smooth curve given by the parameters of the input signal, provided that the integration takes place over a sufficiently long time. An important point of the invention consists in the determination of for instance the time constant of an applied exponential function on the basis of the new function. This is possible by utilizing the well known principle consisting therein that a function is completely defined if the coordinates thereof are given in a sufficient number of points (curve approximation), and in three points in the case of the parabola. This can be done manually or automatically as will appear from the following description.

Further reduction of noise can be obtained by integrating in several steps. This requires an increase in the number of necessary coordinates with associated values.

Figure 7:
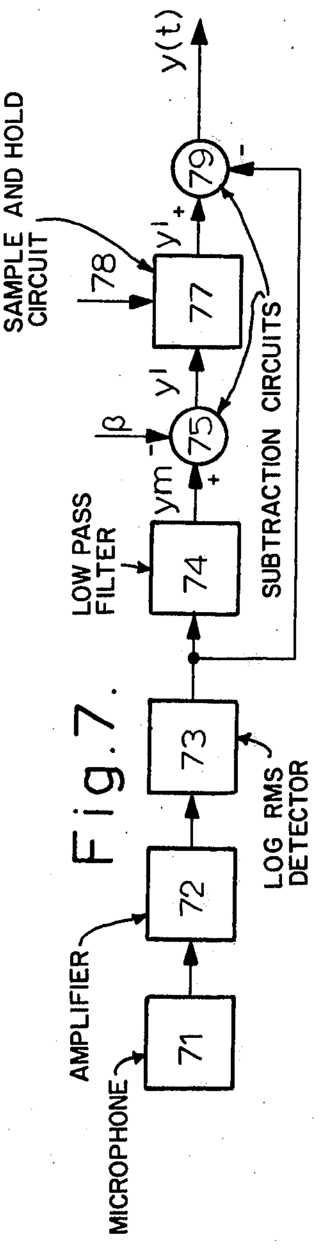
Figure 2:
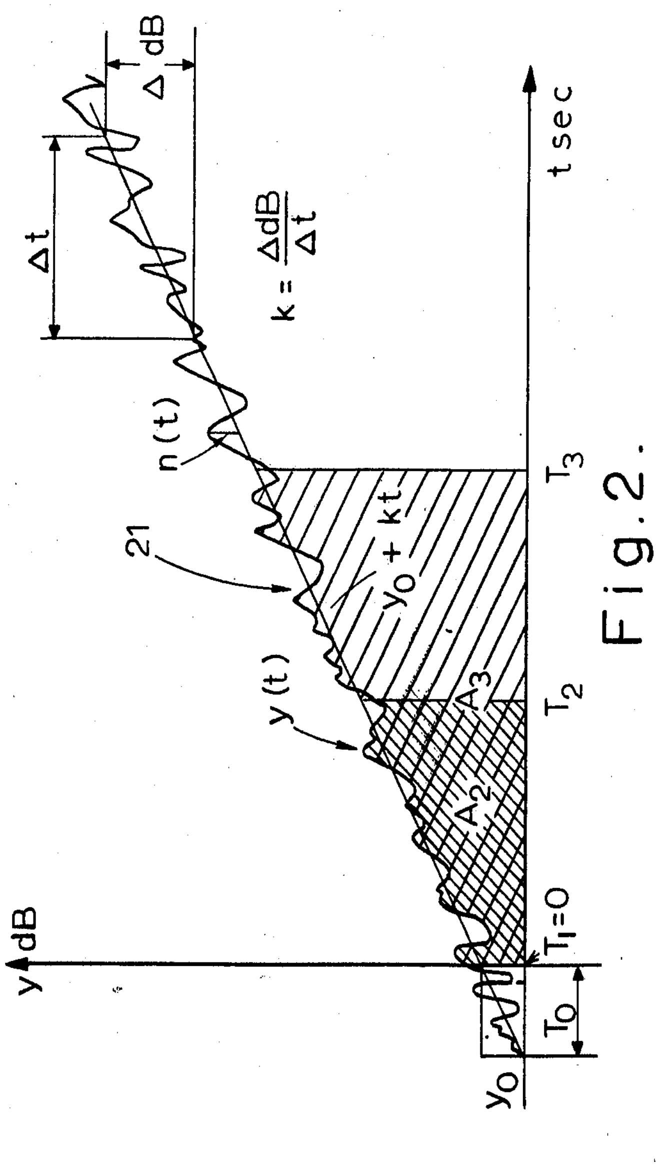
Figure 3:
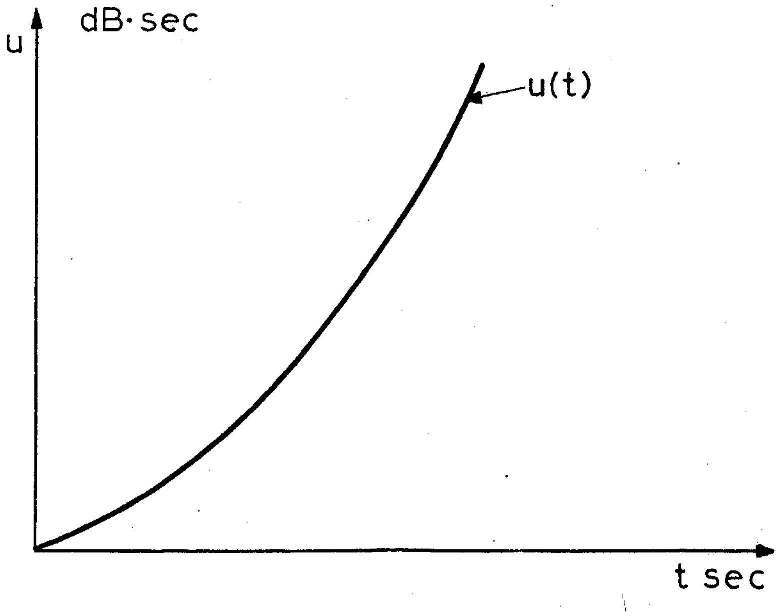
Figure 4:
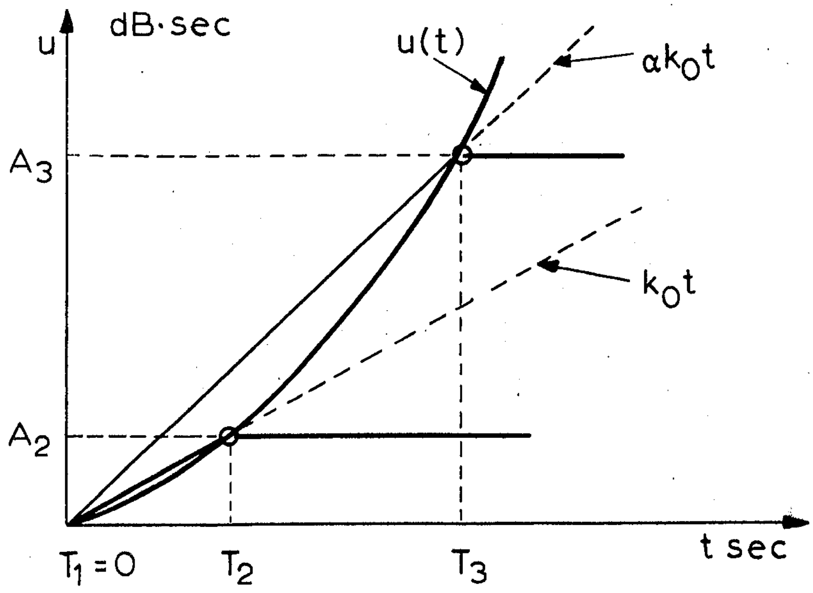
Figure 5:
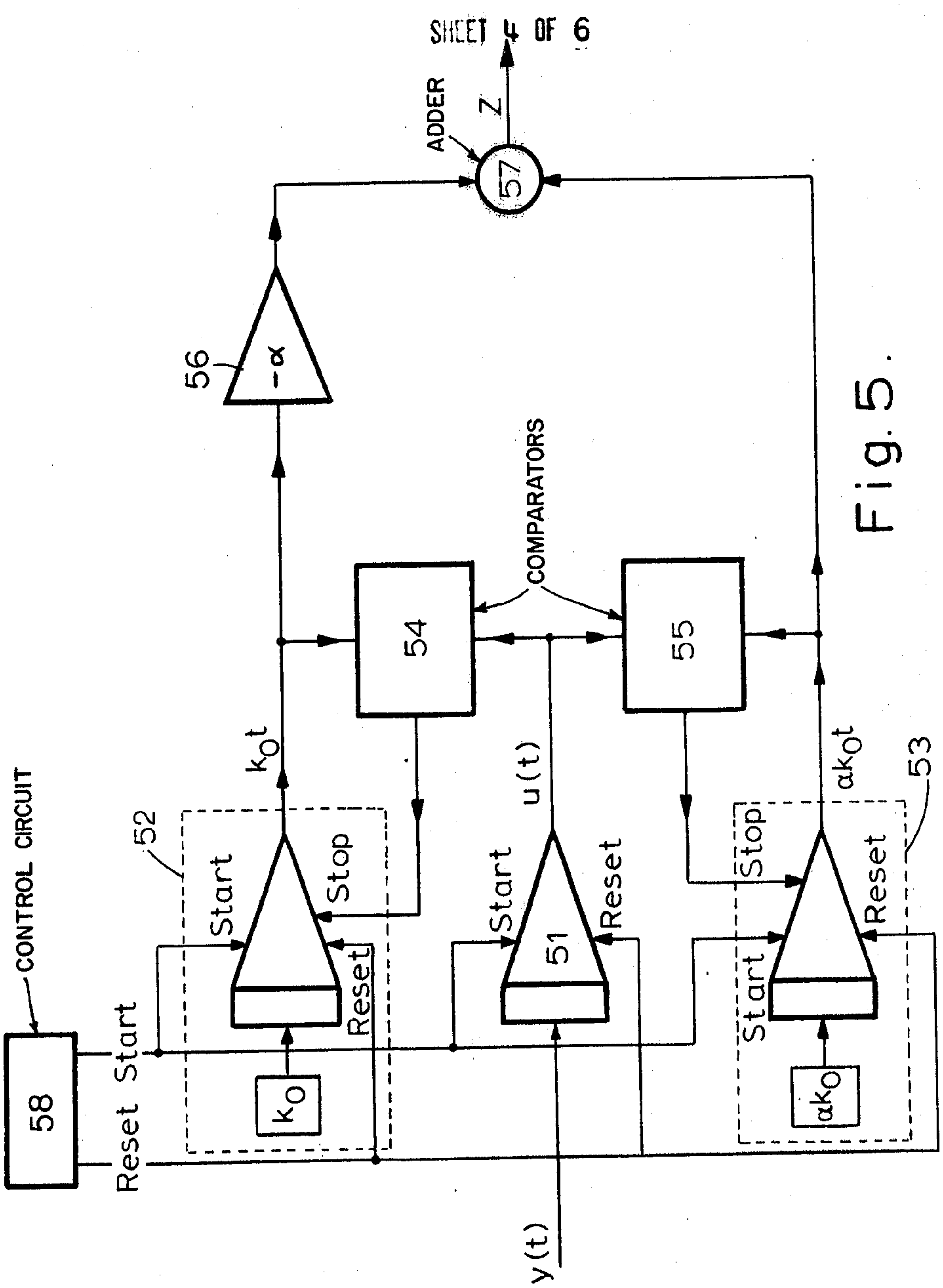
Figure 6:
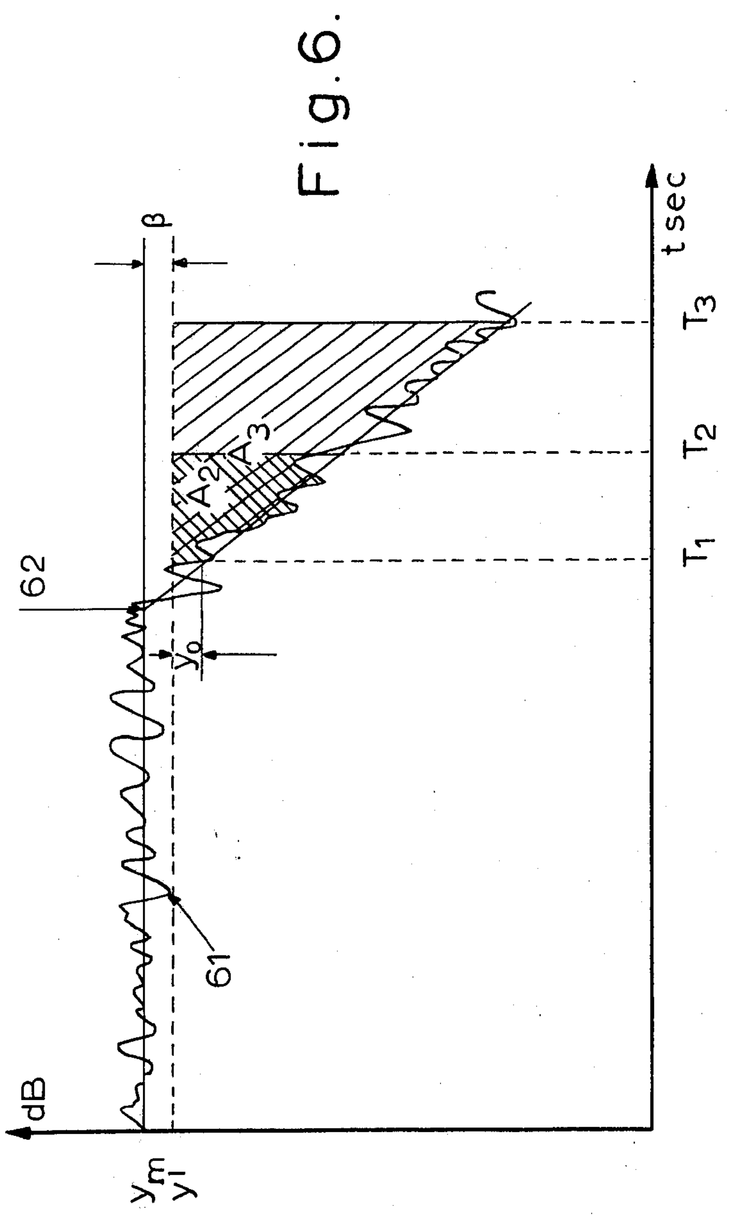

For a better understanding of the principle and function of the invention the same will now be described by way of illustrative examples and with reference to the drawings in which:

FIG. 1 in a coordinate system shows a physical condition which is suddenly changed and decays as a function of time, FIG. 2 in a coordinate system shows a logarithmically presented sound pressure level over a large dynamic range, which can be related to the decaying condition shown in FIG. 1, FIG. 3 in a coordinate system shows a parabolic function formed by one integration of a time function as shown in FIG. 2, FIG. 4 illustrates how from the function according to FIG. 3 those signal magnitudes can be determined which together define the slope angle of the function according to FIG. 2, or the reverberation time of a sound pressure level which decays in similarity to the condition shown in FIG. 1, FIG. 5 shows the main features of a first embodiment of a circuit diagram with electronic components used in order to realize the illustrations according to FIGS. 1–4, FIG. 6 shows diagrammatically a way in which the desired signal magnitudes of a function according to FIG. 2 (or FIG. 1) can be referred to known relationships in order to adapt in a preferred way, such a function to the circuit diagram according to FIG. 5 when this is desirable, and FIG. 7 shows an arrangement of equipment for realizing the relationships shown in FIG. 6.

Figure 8:
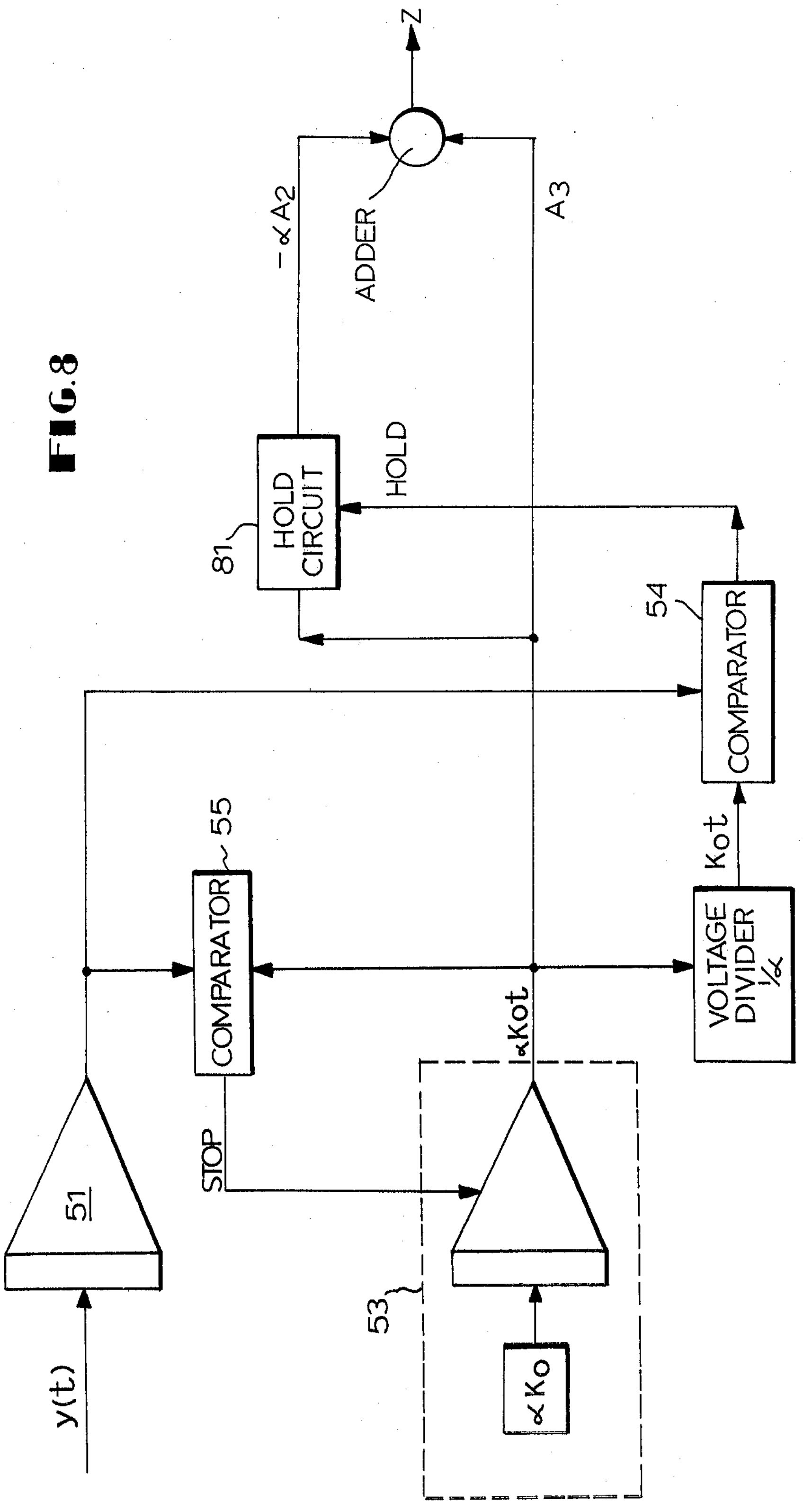

FIG. 8 depicts a second embodiment of the subject invention.

As an illustrating example the invention shall now be formulated in a mathematic way on the basis of the examples shown in FIGS. 1–4. First, however, these Figures shall be explained briefly in order to facilitate an understanding of the following mathematical formulation.

In FIG. 1 a curve 11 shows how a physical condition is falling towards zero as a function of time from a time indicated at 12. Fluctuations, i.e. noise, are present as superpositioned oscillations and are designated by the component n(t). The ratio $k = -\Delta y / \Delta t$ indicates the slope of the descending curve. This curve is representative of a decaying sound pressure when this is given on a logarithmic scale, and is in FIG. 2 shown in another coordinate system.

In FIG. 2 the decaying sound pressure level is designated 21. This level can be expressed mathematically by $y(t) = y_0 + kt + n(t)$, in which $y_0 + kt$ represents an average value of the level 21 and $n(t)$ is the noise component. The slope is indicated by $k = \Delta dB/\Delta t$. The times $T_1$, $T_2$ and $T_3$ shall be considered in the following mathematical formulation. The hatched area $A_2$ and the area $A_3$ between $T_1$ and $T_3$ are magnitudes to be determined.

In FIG. 3 the function $u(t) = y_0 t + ½kt^2 + \int n(t)\,dt$ is a time function obtained by one integration of $y(t)$, see FIG. 2.

FIG. 4 the same function as in FIG. 3 is shown. The integration of the signal $y(t)$ is started when $T_1 = 0$ and is terminated when $$u(t) = \int_{T_1}^{t} y(t)\,dt$$

has the same numerical value as the straight line $k_0 t$, whereby the area $A_2$ is formed. Besides $y(t)$ is integrated from the time $T_1$ until $$u(t) = \int_{T}^{t} y(t)\,dt$$

has the same numerical value as the straight line $\alpha k_0 t$, where $\alpha$ is a chosen constant. Thereby the area $A_3$ is formed.

Reference is now made to FIGS. 1–4 in common.

In the mathematical formulation of the operation according to the invention it is practical to take as a starting point the equation for the straight line with superposed noise $$y(t) = y_0 + kt + n(t) \tag{1}$$

in which $y_0 + kt$ represents a straight line without superposed noise, and $n(t)$ is the noise component, see FIGS. 1 and 2.

By integrating $y(t)$ a new time function $u(t)$ is obtained.

$$u(t) = \int y(t)\,dt = \int (y_0 + kt + n(t))\,dt \tag{2}$$

which has the solution $$u(t) = y_0 t + ½kt^2 + \int n(t)dt. \tag{3}$$

In equation (3) the integration constant has been deleted because in the further utilization of the expression there is always referred to a certain integral. If the integration takes place in the interval $T_1$ to $T_2$ as indicated in FIG. 2, there is obtained (4)

$$u(t) = A_2 = y_0(T_2 - T_1) + ½k(T_2^2 - T_1^2) + \int_{T_1}^{T_2} n(t)\,dt$$

which represents the hatched area $A_2$ in FIG. 2. From this it is clearly apparent that the term $$\int_{T_1}^{T_2} n(t)\,dt$$

has little influence on $A_2$ if the noise signal $n(t)$ has an average value equal to zero. It is to be noted here that $y_0$ and $k$, both being unknown magnitudes in equation (4), are independent of the superposed noise $n(t)$.

By also calculating $$A_3 = \int_{T_1}^{T_3} y(t)\,dt,$$

there is obtained two equations with two unknown so that $k$ can be calculated, i.e.:

$$A_2 = y_0(T_2 - T_1) + ½k(T_3^2 - T_1^2) \tag{5}$$

and $$A_3 = y_0 (T_3 - T_1) + \tfrac{1}{2}k (T_2^2 - T_1^2) \quad (6)$$

in which $A_3$ is the area beneath the curve in FIG. 2 in the interval $T_1$ to $T_3$.

According to this principle it is possible to determine $k$, when $y_0$ is unknown, without having the result substantially influenced by the fluctuations of the input signal.

As an example of which operations are necessary in order to realize the calculation by means of a relatively simple electronic circuit, one may imagine that the integration starts when $T_1 = 0$ and is then automatically interrupted in the instant when $$\int_{T_1}^{t} y(t)\,dt$$

has the same numerical value as a linear time function $k_0t$, which is also initiated when $T_1 = 0$. This yields $$A_2 = k_0 T_2 \quad (7)$$

and $$A_2 = y_0 T_2 + \tfrac{1}{2}kT_2^2. \quad (8)$$

The integration of $A_3$ begins in the same instant of time, but it is chosen to stop the integration when $$u(t) = \int_{T_1}^{t} y(t)\,dt$$

has the same numerical value as $\alpha k_0 t$, i.e.:

$$A_3 = \alpha k_0 T_3 \quad (9)$$

$$A_3 = y_0 T_3 + \tfrac{1}{2}kT_3^2 \quad (10)$$

in which $\alpha$ is a suitably chosen constant.

From equations (7), (8), (9) and (10) it is found that $$A_2 = (2k_0^2/k) - (2y_0k_0/k) \quad (11)$$

and $$A_3 = (2\alpha^2k_0^2/k) - (2y_0k_0\alpha/k) \quad (12)$$

$A_2$ and $A_3$ are the magnitudes sought which contain information regarding those parameters which indicate how quickly changes take place in the curve $y(t)$.

Thus, in this example the parabolic curve is known in that three points thereon are determined, that is $A_2$, $A_3$ and the origin of the coordinate system. It is noted here that the latter point of the parabola must not necessarily be located in the origin of coordinates, nor does the parabola have to go through this origin. It should also be noted that an additional number of points may be determined, which among others makes it possible to check the result.

The magnitudes $A_2$ and $A_3$ which are sought, can now be treated in a suitable way so as to find those parameters which indicate how quickly changes take place in the rising or descending curve. By for instance subtracting $\alpha A_2$ from $A_3$ also $y_0$ is eliminated $$Z = A_3 - \alpha A_2 = (2k_0^2\alpha/k)\,(\alpha-1) \quad (13)$$

and $$k = [2k_0^2\alpha(\alpha-1)]/Z \quad (14)$$

As far as the measurement of reverberation time in an acoustical room is concerned, what has actual interest is to determine $1/k$ which is directly proportional to the reverberation time. $k$ has the dimension $d$B/sec., whereas the reverberation time as mentioned above, is defined as the time taken from the instant when a source of sound is switched off until the sound pressure level has fallen by 60 dB. The reverberation time therefore will have the dimension sec./dB, but since dB in fact has no dimension, the reverberation time is given in seconds.

Therefore, the reverberation time $\tau$ will be $$\tau = 60Z/[2k_0^2\alpha(\alpha-1)] \quad (15)$$

$k_0$ and $\alpha k_0$ which indicate the slope of the linear increasing function as shown in FIG. 4, determine how large a portion of the straight line (according to FIG. 2) can be used as a basis for calculating $k$. In practice $k_0$ should be chosen so as to obtain a sufficient reduction of noise, in other words:

$$\int_{T_1}^{T_2} n(t)\,dt$$

shall be substantially less than $A_2$

FIG. 5 shows the main features of the circuit diagram of electronic components being employed in order to realize the required computations. Before explaining this diagram it would be appropriate, however, to give some comments regarding $y_0$ (see FIG. 2). It will be advantageous to start the integration of $y(t)$ at an instant of time which makes $y_0$ as small as possible. The ideal condition would be that $y_0 = 0$, but in practice because of the fluctuations, there will always exist a certain uncertainty in th starting instant. In other words, because of the fluctuations of the signal, it is difficult to have the integration of $y(t)$ started at the instant when the signal begins to fall (or to rise, as illustrated in FIG. 2). Thus, there is a delay ($T_0$) which causes $y_0$.

In FIG. 5 there is included an electronic integrator 51 to which there is applied an electric input signal $y(t)$ in the form of a sound pressure level (dB), see FIG. 2 and equation (1), and which delivers an output signal $u(t) = y_0t + \tfrac{1}{2}kt^2 + \int n(t)dt$ (see equation (4). A function generator 52 produces an output singal $k_0t$. A second function generator 53 has an output signal $\alpha k_0 t$. The function generators can be built in various ways and the output signals thereof can have different characters. Those which are shown in FIGS. 5 and 8 consist of an integrator to which there is applied a constant voltage.

A conventional control circuit 58 shown in FIG. 5, provides for the operation of the integrator 51 and the function generators in the desired sequence. Before the calculations start, there is applied a signal to the line "Reset" which bring the integrator and the function generator group into the zero condition. At the instant when the source of sound is switched off or immediately afterwards, there is sent a signal on the line "Start," whereupon the integration is started and the output signals begin to rise as shown in FIG. 4. The output of the integrator 51 and the function generators 52 and 53 is connected to a comparing circuit consisting of two comparators 54 and 55 which compare two electrical voltages and start to deliver a characteristic signal when one of the voltages becomes higher than the other. The signal from each of the comparators 54 and 55 is used for stopping the respective function generators 52 and 53. Thus, according to what is explained above (see equations (7), (8), (9) and (10)), when the comparators 54 and 55 have stopped the respective function generators 52 and 53, the output signal from the generator 52 will represent the area $A_2$ in FIGS. 2–4, and the output signal from the generator 53 will represent the area $A_3$ in FIGS. 2–4. The output signal from the generator 52 is amplified by the factor $=\alpha$ in an amplifier 56.

The output signals from the function generator 53 and the amplified output signal from the function generator 52 are then added in the circuit 57. The output signal Z from the circuit 57 therefore will be $$z = A_3 - \alpha A_2$$

which is directly proportional to the reverberation time (see equation (15).

To an expert in electronics it will be evident that the operation to be effected can be realized in various ways. The apparatus shown in FIG. 5 is only an example. One modification, shown in FIG. 8, omits the function generator 52. In this Figure, like numbers denote identical elements to those shown in FIG. 5. Instead the output signal from the function generator 53 (or a certain fraction thereof) is derived and fed to a hold-circuit 81 which is brought to hold the signal at the instant when a comparator 54 gives a command to that effect. One input terminal of this comparator is then connected to the integrator output 51, and the other input is connected to receive a certain portion of the output signal from the generator 53. The output signal from the hold circuit and the output signal from the function generator are proportional to the areas $A_2$ and $A_3$ as defined by equations 11 and 12.

The apparatus can also comprise an additional number of function generators for checking purposes, as mentioned above. In such case it can be practical to employ several amplifiers with known amplification, in the respective branch circuits.

An expert in the field will easily be able to connect necessary equipment to the circuit according to FIG. 5 in order to form a complete system for the measurement of for instance reverberation time. Here one such possibility shall be pointed out.

As will be immediately realized, necessary auxiliary equipment will comprise a microphone with amplifier, and an RMS detector connected to the output of the amplifier. In the circuit of FIG. 7 there is a conventional RMS detector 73 which produces a voltage proportional to the logarithm of the RMS value of the input signal thereto. One such detector is described in Norwegian Patent specification No. 125,362 (corresponds to German Offenlegungschrift 2,162,337), and the output signal therefrom will have a form as shown in FIG. 1. When measuring reverberation time this output signal cannot, however, be applied directly as an input signal to the apparatus in FIG. 5, and one solution in this respect shall therefore be given in the following.

When the sound is switched off, transients usually exist and it is desirable to commence the signal processing downwardly on the decaying curve to avoid the transients. In FIG. 6 there is shown how it is possible to refer the two previously defined areas $A_2$ and $A_3$ to a straight line $y'$ and at a given distance $\beta$ from the average sound pressure level $y$ of a signal 61 from the above RMS detector. The source of sound is switched off at the time designated 62.

FIG. 6 can be realized with technology currently known to an expert in electronics. One way is shown in FIG. 7 which as a whole shows the auxiliary equipment to be connected to the circuit according to FIG. 5. The component designated 71 is a microphone which is connected to an amplifier 72 the output signal of which is connected to the input of a logarithmic RMS detector 73, as described in the above patent specification. The output of the detector 73 is connected to a lowpass filter 74 which determines the average value $y_m$ of the sound pressure level 61. The value $y_m$ and a constant voltage $\beta$ are applied to a subtraction circuit 75, and the output signal $y'$, which corresponds to the straight line mentioned, is fed to a sample and hold curcuit 77 to which there is applied a sampling signal 78 at the instant when the source of sound (not shown) adjacent the microphone is switched off. The sound pressure level 61 from the detector 73 is subtracted from the signal $y'$ in the circuit 79, whereby there is delivered a signal $y(t)$ which is suitable as an input signal to the circuit according to FIG. 5 when measuring reverberation time.

When measuring reverberation time it may also be of interest to employ a source of sound producing a bang, for instance a piston shot, instead of a continuous source of sound which is switched off. The sample and hold circuit 77 is then replaced by a peak anad hold circuit.

What is claimed is:

1. Apparatus for determining parameters indicative of the rate of change of a time function, comprising:
   - integrating means for intergrating an input time function;
   - first and second function generator means for generating respective output signals representing predetermined time functions;
   - control means coupled to said integrating means and to said first and second function generator means for starting and resetting the respective means;
   - first comparator means connected to said integrating means and to said first function generator means for determining when the outputs thereof are equal and for stopping said first function generator means when the output of said integrating means exceeds the output of said first comparator means;

second comparator means connected to said integrating means and to said second function generator means for determing when the outputs thereof are equal and for stopping said second function generator means when the output of said integrating means exceeds the output of said second comparator means; and means coupled to said function generator means for producing an output directly proportional to the desired parameters.

2. The device of claim 1 wherein said means for producing an output is comprised of amplifier means coupled to the output of said first function generator means for amplifying the output thereof by $-\alpha$ and adder means coupled to said amplifier means and to said second function generator means for adding the output signals thereof.

3. The device of claim 1, further comprising an input circuit coupled to said integrating means, said input circuit comprised of means for representing the input time function on a logarithmic scale, whereby an exponential time function can be investigated as said input function.

4. The device of claim 3, wherein said means for representing the input time function is a logarithmic detector.

5. The device of claim 3, wherein said input circuit further comprises a low pass filter coupled to the output of said representing means, a first summing circuit coupled to said low pass filter and a reference signal being also applied thereto, a hold circuit coupled to the output of said first summing circuit, a second summing circuit coupled to the output of said hold circuit and said representing means, the output of said second summing circuit coupled to said integrating means.

6. The device of claim 1 comprising further function generator means operatively coupled thereto.

7. Apparatus for determining parameters indicative of the rate of change of a time function, comprising:

integrating means for integrating an input time function;

function generator means for generating an output signal representing a predetermined time function;

control means coupled to said integrating means and to said function generator means for starting and resetting the respective means;

first comparator means connected to said integrating means and to said function generator means for determining when the outputs thereof are equal and for stopping said function generator means when the output of said integrating means exceeds the output of said function generator means;

voltage dividing means coupled to said function generating means;

a hold circuit operatively coupled to said function generator means;

second comparator means connected to said voltage dividing means and to said integrating means for determining when the outputs thereof are equal and for stopping said hold circuit when the output of said integrating means exceeds the output of said voltage dividing means; and means coupled to said function generator means and to said hold circuit for producing an output directly proportional to the desired parameters.

8. The device of claim 7 wherein said hold circuit is coupled to said voltage divider, said means for producing an output comprised of amplifier means coupled to the output of said hold circuit for amplifying the output thereof by $-\alpha$ and adder means coupled to said amplifier means and to said function generator means for adding the output signals thereof, and said voltage divider dividing a signal input thereto by $\alpha$.

9. The device of claim 7, wherein said input circuit is comprised of means for representing the input time function of a logarithmic scale, whereby an exponential time function can be investigated as said input function.

10. The device of claim 9, wherein said means for representing the input time function is a logarithmic detector.

11. The device of claim 9, wherein said input circuit further comprises a low pass filter coupled to the output of said representing means, a first summing circuit coupled to said low pass filter and a reference signal being also applied thereto, a hold circuit coupled to the output of said first summing circuit, a second summing circuit coupled to the output of said hold circuit and said representing means, the output of said second summing circuit coupled to said integrating means.

* * * * *